(12) United States Patent
Lockhart et al.

(10) Patent No.: US 9,942,208 B2
(45) Date of Patent: Apr. 10, 2018

(54) UPDATING STORED ENCRYPTED DATA WITH ENHANCED SECURITY

(71) Applicant: Microsoft Technology Licensing, LLC., Redmond, WA (US)

(72) Inventors: Jason Paul Lockhart, Issaquah, WA (US); Patrick J. McFalls, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 565 days.

(21) Appl. No.: 14/542,257

(22) Filed: Nov. 14, 2014

(65) Prior Publication Data

US 2016/0352705 A1 Dec. 1, 2016

(51) Int. Cl.
*H04L 9/00* (2006.01)
*H04L 29/06* (2006.01)

(52) U.S. Cl.
CPC ......... *H04L 63/061* (2013.01); *H04L 63/102* (2013.01); *H04L 63/0428* (2013.01); *H04L 63/083* (2013.01)

(58) Field of Classification Search
CPC . H04L 63/0428; H04L 63/061; H04L 63/083; H04L 63/102
See application file for complete search history.

(56) References Cited

U.S. PATENT DOCUMENTS

| | | |
|---|---|---|
| 5,335,346 A | 8/1994 | Fabbio |
| 6,119,230 A | 9/2000 | Carter |
| 6,405,315 B1 * | 6/2002 | Burns ............... G06F 17/30067 707/E17.01 |
| 7,362,868 B2 | 4/2008 | Madoukh et al. |
| 7,823,190 B1 | 10/2010 | Kacarov et al. |
| 7,827,598 B2 | 11/2010 | Moran et al. |
| 8,176,283 B1 | 5/2012 | Hanson et al. |
| 8,295,490 B1 | 10/2012 | McCoy et al. |
| 8,325,924 B2 | 12/2012 | Acar et al. |

(Continued)

FOREIGN PATENT DOCUMENTS

| | | |
|---|---|---|
| CN | 101345694 A | 1/2009 |
| CN | 101431516 A | 5/2009 |
| WO | 2007044964 A2 | 4/2007 |

OTHER PUBLICATIONS

Office action for U.S. Appl. No. 14/542,384, dated Apr. 22, 2016, Lockhart et al., "Storage for Encrypted Data With Enhanced Security", 20 pages.

(Continued)

*Primary Examiner* — Sayed Beheshti Shirazi
(74) *Attorney, Agent, or Firm* — Scott Y. Shigeta; Newport IP, LLC

(57) ABSTRACT

Technologies described herein provide enhanced security for storing and updating secret data, such as a password. Based on one or more conditions, an existing encryption key or a new encryption key may be used to generate encrypted data at a client computing device. The encrypted data may be communicated from the client computing device to a secret store managed by a first entity for storage of the encrypted data in the secret store. Based on one or more conditions, the new encryption key may be communicated from the client computing device to a key store managed by a second entity for storage of the new encryption key in the key store.

15 Claims, 8 Drawing Sheets

(56) References Cited

U.S. PATENT DOCUMENTS

| | | | |
|---|---|---|---|
| 8,601,263 B1 | 12/2013 | Shankar et al. | |
| 8,601,600 B1 | 12/2013 | Shankar et al. | |
| 9,118,664 B1* | 8/2015 | Negahdar | H04L 63/0442 |
| 2004/0034771 A1* | 2/2004 | Edgett | G06F 21/31 |
| | | | 713/168 |
| 2004/0083393 A1* | 4/2004 | Jordan | H04L 63/068 |
| | | | 726/6 |
| 2004/0133812 A1* | 7/2004 | Ohmori | G06F 21/31 |
| | | | 726/18 |
| 2005/0257211 A1* | 11/2005 | Chatterjee | G06F 8/67 |
| | | | 717/170 |
| 2006/0056625 A1 | 3/2006 | Nakabayashi et al. | |
| 2006/0291664 A1 | 12/2006 | Suarez et al. | |
| 2008/0059799 A1 | 3/2008 | Scarlata | |
| 2008/0209221 A1* | 8/2008 | Vennelakanti | H04L 63/062 |
| | | | 713/183 |
| 2008/0240429 A1* | 10/2008 | Kito | G06F 21/805 |
| | | | 380/45 |
| 2009/0013196 A1* | 1/2009 | Ito | H04L 9/3236 |
| | | | 713/193 |
| 2009/0075630 A1* | 3/2009 | McLean | G06F 21/602 |
| | | | 455/411 |
| 2009/0175444 A1 | 7/2009 | Douglis et al. | |
| 2009/0327739 A1* | 12/2009 | Relyea | H04L 63/062 |
| | | | 713/182 |
| 2010/0199098 A1* | 8/2010 | King | G06F 21/6254 |
| | | | 713/182 |
| 2010/0208898 A1 | 8/2010 | Acar et al. | |
| 2010/0257351 A1 | 10/2010 | O'Connor et al. | |
| 2010/0306554 A1 | 12/2010 | Nunez-Tejerina et al. | |
| 2011/0265160 A1* | 10/2011 | Nettleton | G06F 21/31 |
| | | | 726/6 |
| 2011/0293096 A1 | 12/2011 | Reilly et al. | |
| 2012/0069996 A1* | 3/2012 | Turk | H04L 41/0816 |
| | | | 380/44 |
| 2012/0321087 A1* | 12/2012 | Fleischman | H04L 9/3213 |
| | | | 380/279 |
| 2013/0007464 A1* | 1/2013 | Madden | G06F 21/6218 |
| | | | 713/179 |
| 2013/0013931 A1* | 1/2013 | O'Hare | G06F 21/62 |
| | | | 713/189 |
| 2013/0262875 A1* | 10/2013 | Garrard | G06F 17/30289 |
| | | | 713/189 |
| 2013/0339746 A1* | 12/2013 | Ignatchenko | H04L 9/3226 |
| | | | 713/183 |
| 2014/0181985 A1* | 6/2014 | Mamidwar | G06F 21/10 |
| | | | 726/26 |
| 2016/0019540 A1* | 1/2016 | Tsutsui | G06Q 20/327 |
| | | | 705/71 |
| 2016/0028699 A1* | 1/2016 | Ambroz | H04L 63/0428 |
| | | | 713/168 |
| 2016/0142387 A1 | 5/2016 | Lockhart et al. | |

OTHER PUBLICATIONS

"International Search Report and Written Opinion Issued in PCT Application No. PCT/US2015/060235", dated Aug. 1, 2016, 10 Pages.

U.S. Appl. No. 14/542,384, Non Final Office Action dated Aug. 2, 2016, 21 pages.

U.S. Appl. No. 14/542,384—Final Office Action dated Dec. 22, 2016, 22 pages.

Acar, et al., "Key Management in Distributed Systems", In Technical Report MSR-TR-2010-78, Jun. 2010, 14 pages.

Chen,"NIST Special Publication 800-108 Recommendation for Key Derivation Using Pseudorandom Functions", In Proceedings of Computer Security Division Information Technology Laboratory, Oct. 2009, 21 pages.

Dworkin, "Recommendation for Block Cipher Modes of Operation: The CCM Mode for Authentication and Confidentiality", In Technical Report SP 800-38C, May 2004, 27 pages.

Dworkin, "Recommendation for Block Cipher Modes of Operation: The Galois/Counter Mode (GCM) and GMAC", In Technical Report SP 800-38D, Nov. 2007, 39 pages.

Harney, et al., "Group Key Management Protocol (GKMP) Architecture", In Proceedings of Request for Comments: 2094, Experimental, Jul. 1997, 21 pages.

Kaliski, et al., "A Layman Guide to a Subset of ASN.1, BER, and DER", Retrieved from <<http://luca.ntop.org/Teaching/Appunti/asn1.html>>, Nov. 1993, 27 pages.

Microsoft, "LSA Policy", Retrieved on: Dec. 23, 2013, at: <<http://msdn2.microsoft.com/en-us/library/ms721831(VS.85).aspx>>, 1 page.

Microsoft, "[MS-BKRP] BackupKey Remote Protocol", Retrieved on Dec. 23, 2013, at: <<http://msdn.microsoft.com/en-us/library/cc224123.aspx>>, 3 pages.

Microsoft, "[MS-ERREF]: Windows Error Codes", Retrieved from <<http://download.microsoft.com/download/9/5/E/95EF66AF-9026-4BBO-A41D-A4F81802D92C/%5bMS-ERREF%5d.pdf>>, Oct. 2013, 534 pages.

Microsoft, "[MS-KILE]: Kerberos Protocal Extensions", Retrieved from <<http://download.microsoft.com/download/9/5/E/95EF66AF-9026-4BB0-A41D-A4F81802D92C/%5bMS-KILE%5d.pdf>>, Oct. 2013, 79 pages.

Microsoft, "[MS-SPNG]: Simple and Protected GSS-API Negotiation Mechanism (SPNEGO) Extension", Retreived from <<http://download.microsoft.com/download/9/5/E/95EF66AF-9026-4BB0-A41D-A4F81802D92C/%5bMS-SPNG%5d.pdf>>, Oct. 2013, 34 pages.

Microsoft, "EncryptMessage (Kerberos) Function", Retrieved on: Dec. 23, 2013, at <<http://msdn.microsoft.com/en-us/library/aa375385(VS.85).aspx>>, 3 pages.

Microsoft, "How to mark an attribute as confidential in Windows Server 2003 Service Pack 1", Retrieved on: Dec. 23, 2013, at: <<http://support.microsoft.com/kb/922836>>, 4 pages.

Microsoft, "InitializeSecurityContext (Kerberos) function", Retrieved on: Dec. 23, 2013, at <<http://msdn.microsoft.com/en-us/library/aa375507(VS.85).aspx>>, 6 pages.

Microsoft, "Open Protocol Specifications", Retrieved on Dec. 23, 2013, at: <<http://msdn.microsoft.com/en-us/library/dd208104.aspx>>, 2 pages.

Microsoft, "The Administrator Accounts Security Planning Guide", Retrieved from http://technet.microsoft.com/en-us/library/cc162797.aspx>>, Apr. 1999, 3 pages.

Microsoft, "Windows Data Protection", Retrieved from <<http://msdn.microsoft.com/en-us/library/ms995355.aspx>>, Oct. 2001, 9 pages.

Neuman, et al., "The Kerberos Network Authentication Service (V5)", In Proceedings of Request for Comments: 4120, Jul. 2005, 123 pages.

Oracle, "Database Advanced Security Administrator's Guide: 3 Securing Stored Data Using Transparent Encryption", retrieved on Nov. 11, 2014 from <<https://docs.oracle.com/cd/B28359_01/network.111/b28530/asotrans.htm#g1011122>>, 52 pages.

Parker, et al., "Encryption Key and Certificate Management Risks", In Proceedings of Silicon Valley Chapter in ISSA, Oct. 16, 2012, 7 pages.

nuBridges, Inc., "nuBridges ProtectTM", retrieved on Nov. 4, 2014 at <<http://risnews.edgl.com/Media/DocumentLibrary/nuBridges_res09.pdf>>, 2008, 8 pages.

Office action for U.S. Appl. No. 14/542,384, dated Dec. 31, 2015, Lockhart et al., "Storage for Encrypted Data With Enhanced Security", 16 pages.

U.S. Appl. No. 14/542,384—Non Final Office Action dated Jun. 14, 22 pages.

* cited by examiner

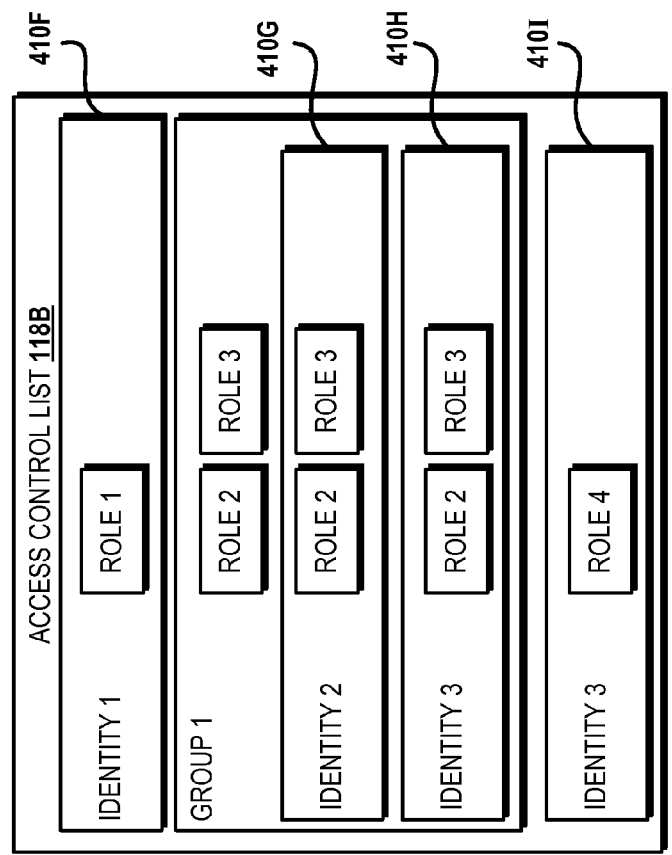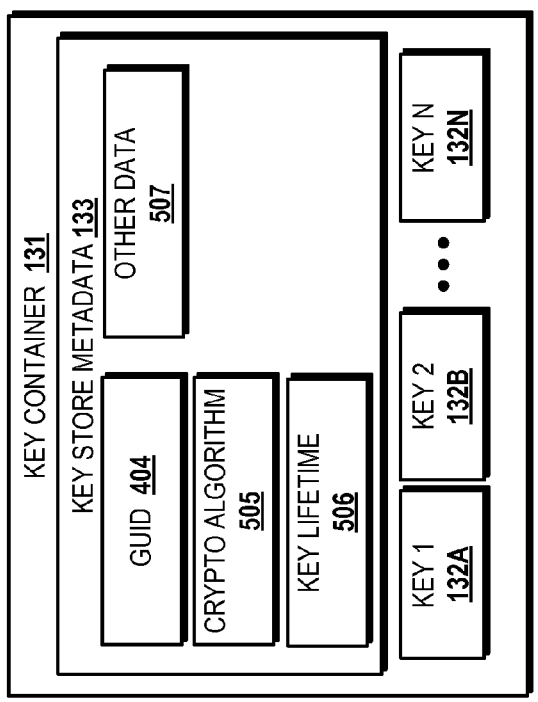
FIGURE 5

UPDATING STORED ENCRYPTED DATA WITH ENHANCED SECURITY

BACKGROUND

The tasks involved with managing a secure system can present challenges for companies of all sizes. For instance, the management of secured data having different levels of access can be costly, and if not administered correctly, human error or other factors can cause security issues. In addition, some existing systems are limited to rigid configurations that do not allow administrators to control access rights that are sufficiently granular. For example, some secure systems provide all-or-nothing access to secret data. In such configurations, once access is granted to a particular record of secret data, there may be no effective way to limit the type of operations that may be performed on the secret data. In addition to operation restrictions on a record, many systems don't provide effective separation between records.

Additional challenges may arise when companies rely on third-party entities hosting security-related services. For instance, a particular company may use a third-party service to store secret data or manage security keys. Although such services may provide more functionality than a self-managed turnkey system, there may be a number of drawbacks for companies that wish to maintain a high level of security against malicious users or even the administrators of the third-party service.

It is with respect to these and other considerations that the disclosure made herein is presented.

SUMMARY

Technologies described herein provide enhanced security for encrypted data. In one or more configurations, encrypted data may be generated at a client computing device, or another type of computing device, by encrypting data with an encryption key. The encrypted data may be communicated from the client computing device to a secret store of a first entity for storage of the encrypted data in the secret store. The encryption key may be communicated from the client computing device to a key store of a second entity for storage of the encryption key in the key store. The secret store may be managed by a first set of administrative access control rights that are exclusive to the secret store. The key store may be managed by a second set of administrative access control rights that are exclusive to the key store. The encryption key and the encrypted data may be accessed by the client computing device by the use of one or more identities authorized to access the secret store and the key store. Other techniques described herein may provide mechanisms for managing access to particular types of stored data for individual identities or groups of identities.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a block diagram showing several example components of a container for storing one or more encryption keys and a corresponding access control list for the container storing the one or more encryption keys.

DETAILED DESCRIPTION

Figure 1:
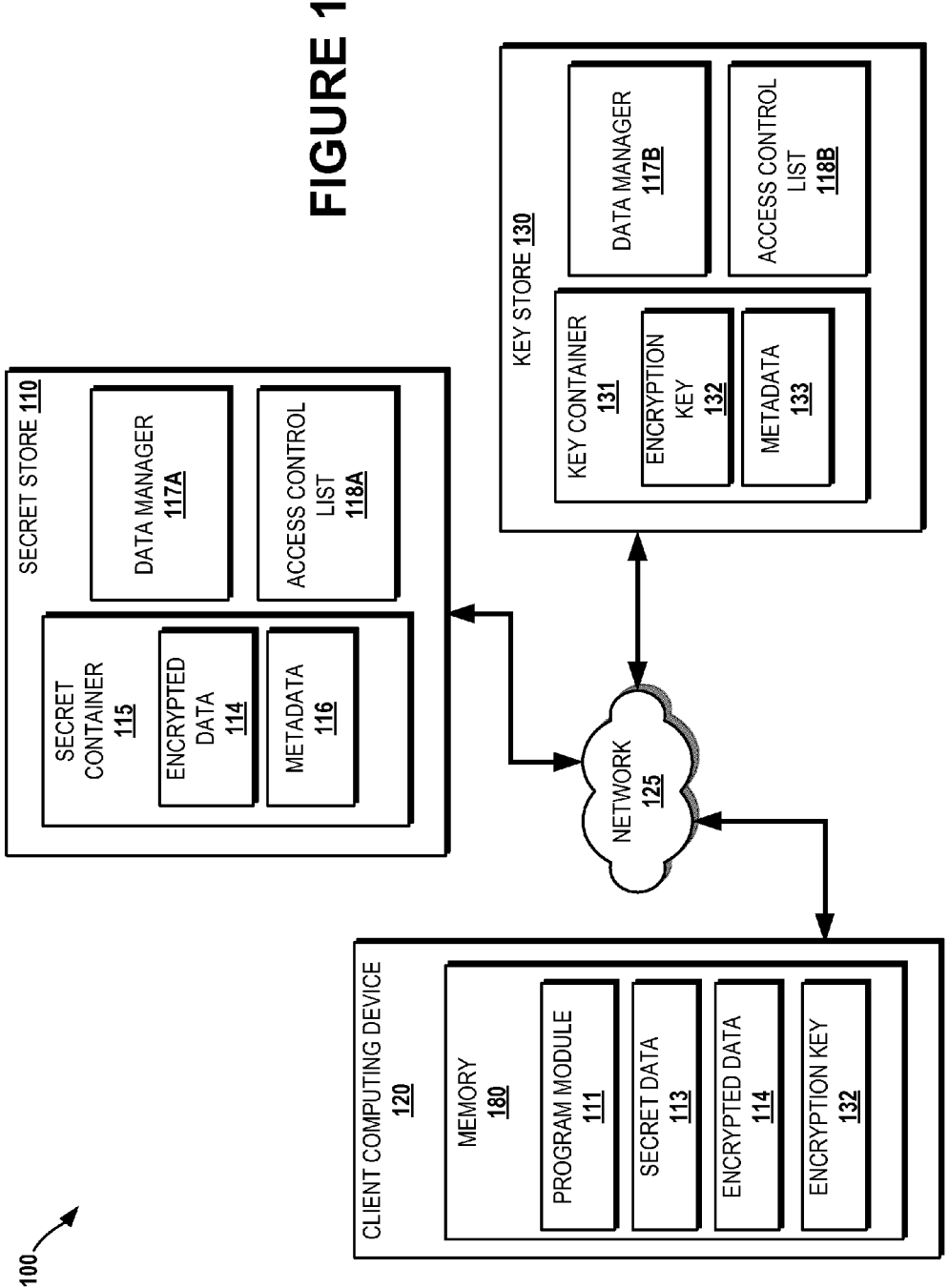
FIG. 1 is a block diagram showing several example components of a system for providing enhanced security for encrypted data.

The following detailed description is directed to concepts and technologies for providing enhanced security for encrypted data. In some configurations, encrypted data may be generated at a client computing device by encrypting secret data with an encryption key. The encrypted data may be communicated from the client computing device to a secret store for storage of the encrypted data in a secret container of the secret store. The encryption key may be communicated from the client computing device to a key store for storage of the encryption key in a secret container of the key store. The secret store may be managed by a first entity controlling a first set of administrative access control rights that are exclusive to the secret store. The key store may be managed by a second entity controlling a second set of administrative access control rights that are exclusive to the key store.

The encryption key and the encrypted data may be accessed by the client computing device by the use of one or more identities authorized to access the secret store and the key store. Other techniques described herein may provide mechanisms for managing access to particular types of stored data for individual identities or groups of identities. Techniques and technologies utilizing a secret store and a key store that are each managed by separate entities help mitigate the risk of unauthorized access to secret data by administrators of either data store while providing access to users or groups of users of the client computing device.

In other configurations, techniques and technologies disclosed herein are used to encrypt a password into an encrypted password using an encryption key. The encrypted password may be communicated from the client computing device to a secret store managed by a first entity for storage of the encrypted data in the secret store. The encryption key may be communicated from the client computing device to a key store of a second entity for storage of the encryption key in the key store.

In other configurations, techniques and technologies disclosed herein are used to update encrypted data such as an encrypted password. For example, a client computing device may receive new data or generate new data, such as a new password. One or more computing devices may determine if there is a need to change an existing encryption key. If it is determined that there is a need to change the existing encryption key, the client computing device generates encrypted data by encrypting the new data, such as the new password, with a new encryption key. The encrypted data is then communicated from the client computing device to a secret store of a first entity for storage. Then the new encryption key is then communicated from the client computing device to a key store of a second entity for storage.

If it is determined that there is not a need to change the existing encryption key, the client computing device generates encrypted data by encrypting the new data, such as the new password, with the existing encryption key. The encrypted data is then communicated from the client computing device to a secret store of a first entity for storage.

The techniques and technologies disclosed herein may also provide different levels of access to the encrypted data, the encryption key and other data. For example, an identity, e.g., a user associated with an account, may have access rights to read usage data associated with an encryption key, but the system may be configured to not allow the same identity to access the encryption key itself. In addition, group permissions may be configured to allow multiple identities to access or utilize one or more encryption keys. Such configurations allow for granular access control to encrypted data, encryption keys and other related data based on one or more defined roles.

While the subject matter described herein is presented in the general context of program modules that execute in conjunction with the execution of an operating system and application programs on a computer system, those skilled in the art will recognize that other implementations may be performed in combination with other types of program modules and/or other types of devices. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced security for encrypted data. As will be described in more detail below with respect to FIGS. 6-8, there are a number of applications and services that can embody the functionality and techniques described herein.

FIG. 1 is a system diagram showing aspects of one illustrative system disclosed herein for providing enhanced security for encrypted data. As shown in FIG. 1, a system 100 may include a client computing device 120, a secret store 110, a key store 130 and a network 125. The client computing device 120 may be, for example, a laptop computer, a desktop computer, a smartphone, a tablet computing device or any other computing device communicatively connected to the secret store 110 and the key store 130 through one or more local and/or wide area networks, such as the network 120. It should be appreciated that many more network connections may be utilized than illustrated in FIG. 1.

The client computing device 120 may include a local memory 180 that may include one or more modules and data structures, such as the program module 111 for processing secret data 113 into encrypted data 114 by the use of one or more encryption keys 132. The program module 111 may also be configured to manage interactions between a user and the client computing device 120. The program module 111 may be in the form of a stand-alone application, a productivity application, an operating system component or any other application or software module having features that interact with a user and/or data stored on the client computing device 120. Additional modules and components of the client computing device 120 are explained below and shown in FIG. 8. As will be described below, the secret data 113 may include a password associated with an identity.

As will be explained below, the program module 111 may also be configured to process secret data, which may include any data where any level of security is desired. As will be described in more detail below, non-limiting examples of the capabilities of the program module 111 may include the generation of one or more encryption keys 132, the management of the encryption keys 132 or other processing of data related to at least one encryption key 132, the secret data 113 or the encrypted data 114. In one or more configurations, the program module 111 may include software configured to perform the technologies described herein. In one illustrative example, the program module 111 may include the use of DISTRIBUTED KEY MANAGER ("DKM") software.

The secret store 110 may be in the form of a server computer or a number of server computers configured to store a data manager 117A, an access control list 118A and at least one secret container 115. The secret container 115 may be in the form of a record of a database or other storage model capable of storing the encrypted data 114 and metadata 116 related to the encrypted data 114.

The key store 130 may be in the form of a server computer or a number of server computers configured to store a data manager 117B, an access control list 118B and at least one key container 131. For illustrative purposes, the secret store 110 and the key store 130 may be collectively or generically referred to herein as "data stores." The key container 131 may be in the form of a record of a database or other storage model capable of storing one or more encryption keys 132 and metadata 133 related to the one or more encryption keys 132.

In some arrangements, the secret store 110 and the key store 130 are independently managed and/or administered by different business entities or different departments of an entity. Administrative control of the secret store 110 may be separated from the administrative control of the key store 130 by a management separation, staffing separation, or another arrangement where individuals or entities managing or controlling each data store do not overlap. Thus, in such configurations and other configurations, administrative access control of the secret store 110 may be exclusive to the secret store 110, and administrative access control of the secret store 110 does not extend, or allow access control, to the key store 130. Similarly, in such configurations and other configurations, administrative access control of the key store 130 may be exclusive to the key store 130, and administrative access control of the key store 130 does not extend, or allow access control, to the secret store 110. As will be appreciated, separation of the administrative control of each data store helps mitigate security concerns.

For illustrative purposes, the client computing device 120 may be associated with an organization, individual, company, machine, system, service, device, or any other entity that utilizes at least one identity to gain access to any stored data. An identity, for example, may be associated with a user account, smart card, certificate or any other form of authentication. The individual, device, business or entity associated with the client computing device 120 may subscribe to, or at least utilize, services offered by a first entity associated with the secret store 110. In addition, the individual, device, business or entity associated with the client computing device 120 may subscribe to, or at least utilize, services offered by a second entity associated with the key store 130. In addition, it can be appreciated that although the system 100 may be sold or marketed as a single product, the secret store 110, the key store 130 and modules and/or hardware for the client computing device 120 may be managed or administered by separate entities or different departments of an organization to create a separation between the administrative access control of the secret store 110 and the administrative access control of the key store 130.

The data manager 117A of the secret store 110 and the data manager 117B of the key store 130 (also referred to collectively and/or generically as the "data managers 117") may be configured to respectively control the communication and processing of data stored in the secret container 115 and the key container 131. For illustrative purposes, a "container," e.g., the secret container 115 or the key container 131, may also be referred to herein as a "record." As can be appreciated, the access control list 118A stored on the secret store 110 and access control list 118B stored on the key store 130 may be utilized and/or managed by the respective data managers 117A and 117B to control access to stored data. For illustrative purposes, the access control list 118A stored on the secret store 110 and access control list 118B stored on the key store 130 are also referred to collectively and/or generically as an "access control list 118."

As will be described in more detail below, an access control list 118 stored on one or more data stores may be configured with entries defining roles and/or privileges associated with one or more identities. The roles and/or privileges allow or deny the execution of operations to access and/or manage stored data for the one or more associated identities. Among many other illustrative examples described herein, techniques described herein utilize the access control list 118 and a data manager 117 to manage granular levels of access control to different types of data. For instance, the system 100 may allow one identity to modify encrypted data 114 and the associated metadata 116, while allowing another identity to only read the metadata 116 associated with the encrypted data 114.

In one or more configurations, the data manager 117 may include software configured to perform the technologies described herein. In one illustrative example, the data manager 117 of each data store may include a database application, a file system, or any other storage system with customizable access controls. In one or more configurations, at least one data manager 117 may include the use of MICROSOFT'S WINDOWS COMMUNICATION FOUNDATION ("WCF") and/or ACTIVE DIRECTORY. Different or similar configurations may be used for each data store. For instance, the data manager 117A of the secret store 110 may be configured with WCF software and the data manager 117B of the key store 130 may be configured with ACTIVE DIRECTORY software. Alternatively, the data manager 117A of the secret store 110 may have the same configuration as the data manager 117B of the key store 130.

As will be described below, techniques disclosed herein include the generation of encrypted data 114 on the client computing device 120 by encrypting the secret data 113 with the encryption key 132. The encrypted data 114 is then communicated from the client computing device 120 to the secret store 110. In some configurations, an identifier (e.g. a GUID) may be generated and used to identify the encrypted data 114. The identifier may be stored in the metadata 116 in the secret container 115.

Also described in more detail below, the metadata 116 may also store other data. For instance, if the encrypted data 114 includes an encrypted password for a user account, the metadata 116 may store the login ID associated with the encrypted password. In another example, if the encrypted data 114 includes a certificate, the metadata 116 may include a subject or a thumbprint. The metadata 116 may include any other data that is related to the encrypted data. For example, the metadata 116 may include information that identifies and/or describes a certificate, card key, another device or other data. In another example, the metadata 116 may also include access and/or usage information that may be used for audits.

In addition to communicating the encrypted data 114 to the secret store 110, the encryption key 132 may be communicated from the client computing device 120 to the key store 130. The encryption key 132 may be stored in a key container 131. In some configurations, the identifier, e.g. the GUID, may be communicated to the key store 130 and stored in the metadata 133 to associate the identifier with the encryption key 132. The use of the identifier is one mechanism that allows the system 100 to associate the encryption key 132 with the encrypted data 114. Although this illustrative example shows the identifier as originating from the secret store 110, it can be appreciated that the identifier may be generated at the key store 130 or any other device.

It can be appreciated that techniques performed on the client computing device 120, may be performed by a program module 111 executing on the client computing device 120. For example, the program module 111 may be configured to generate the encryption key 132, encrypt the secret data 113 into the encrypted data 114, and/or perform other operations performed on the client computing device 120. It can also be appreciated that an implementation utilizing the program module 111 provides only one example and that other modules (not shown) may assist in the processing of the techniques described herein.

In some implementations, the program module 111 may be configured to provide users and/or other devices with an interface control, e.g., a user interface, an application program interface or any other mechanism that may be used control the processing and communication of secret data. In one illustrative implementation, the interface may utilize PowerShell cmdlets. For example, the program module 111 may be configured to interact with the key store 130 to store and retrieve encryption keys 132 and other associated metadata 133. The program module 111 may also be configured to interact with the secret store 110 to store and retrieve encrypted data 114 and associated metadata. The interface and the program module 111 may be used to generate commands or any other directive to manage data stored on the key store 130 and the secret store 110.

In some implementations, the program module 111 and other modules on the client computing device 120 may be configured to set, modify and/or process access control data for each entry in each data store 110 and 130 to produce desired levels of access for each identity accessing the client computing device. In some configurations, the program module 111 or any type of control of the client computing device 120 may be configured to provide an instruction that is communicated from the client computing device 120 to the key store 130 or the secret store 110. The instruction may modify a data structure storing access control rights, such as the access control list 118A or the secret store 110 or the access control list 118B of the key store 130. It can be appreciated that this example is provided for illustrative purposes and is not to be construed as limiting, as any software module operating on the client computing device 120 may be used to modify or process data defining access control data.

As will be explained in more detail below, in coordinating operations that affect both data stores 110 and 130, the client computing device 120 may also be configured to maintain data consistency between the stores. The program module 111 may also be configured to use group key encryption to provide access to multiple users while allowing for key or cryptographic algorithm updates.

Figure 2:
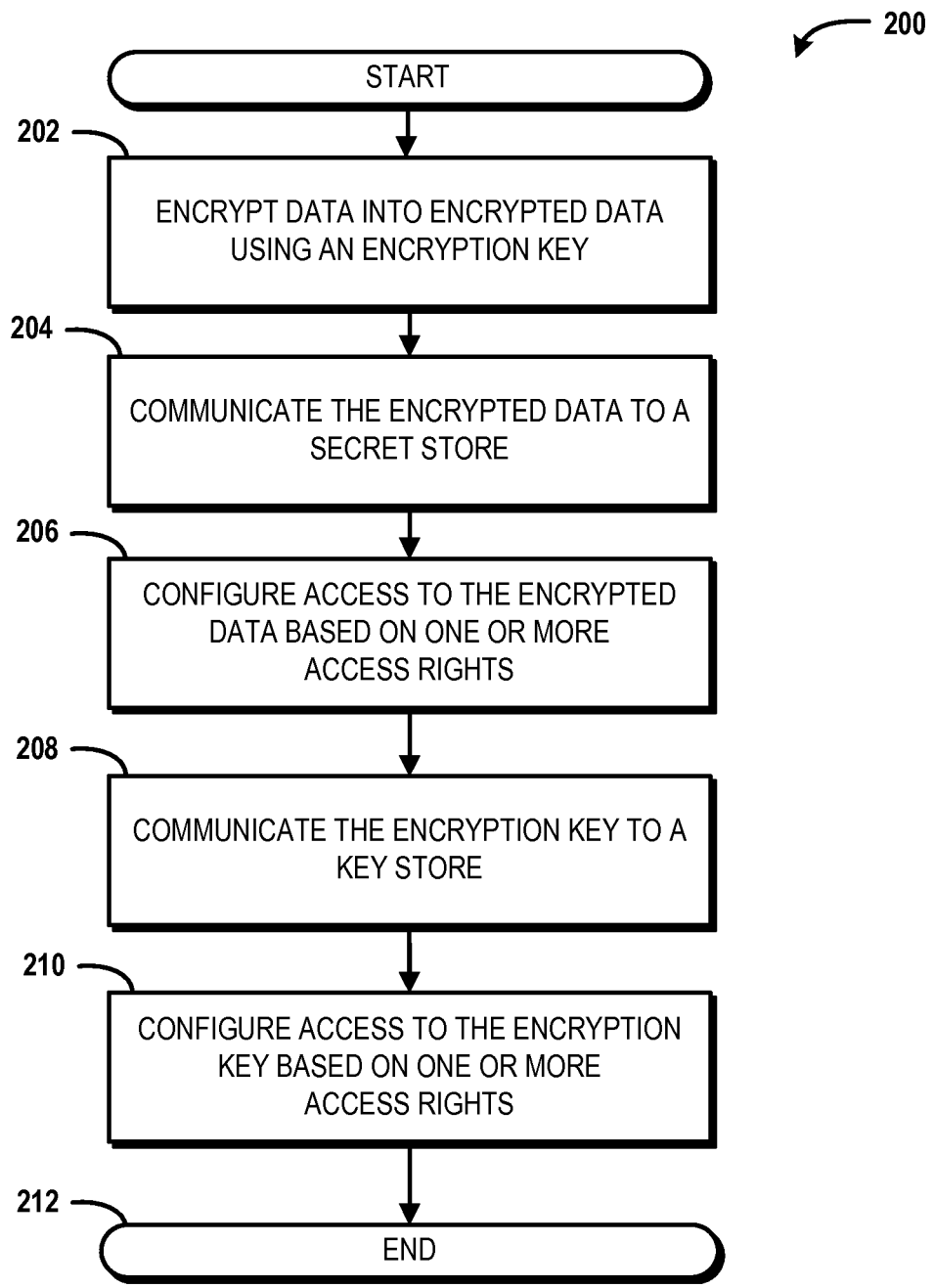
FIG. 2 is a flow diagram illustrating aspects of a method for providing enhanced security for encrypted data.

Turning now to FIG. 2, aspects of a routine 200 for providing enhanced security for encrypted data are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof As will be described in more detail below, in conjunction with FIGS. 6-8, the operations of the routine 200 are described herein as being implemented, at least in part, by an application, such as the program module 111. Although the following illustration refers to the program module 111, it can be appreciated that the operations of the routine 200 may be also implemented in many other ways. For example, the routine 200 may be implemented as part of an operating system or as part of any other application. In addition, it can be appreciated that implementations of the system 100 may include more or fewer computing devices shown in FIG. 1. For instance, each of the software components and modules described above may be implemented in a single computing device configured with the same features. In other scenarios, some of which may include the use of a server farm, any number of computing devices may be used to implement the features and techniques described herein.

With reference to FIG. 2, the routine 200 begins at operation 202, where the program module 111 encrypts the secret data 113 into encrypted data 114 using an encryption key 132. In operation 202, any type of cryptographic algorithm that utilizes a cryptographic key may be utilized to encrypt the secret data 113. In some configurations, the encryption key 132 may be generated by the client computing device 120. To maintain control of the secret data 113 and the encryption key 132, the secret data 113 may be encrypted at the client computing device 120.

Once the secret data 113 is processed into the encrypted data 114 the routine 200 proceeds to operation 204 where the encrypted data 114 is communicated to the secret store 110. Once the encrypted data 114 is received by the secret store 110, the encrypted data 114 may be stored in a record, container or any other suitable storage structure. In one illustrative example, the encrypted data 114 may be stored in the secret container 115, which also stores metadata 116 associated with the encrypted data 114. The metadata 116 may store an identifier associated with the encrypted data 114 as well as other data. For example, as summarized above, if the encrypted data 114 includes a password, the metadata 113 may store a login ID associated with the password. This example is provided for illustrative purposes and is not intended to be construed as limiting.

Next, at operation 206, the secret store 110 may configure access rights and other properties of the encrypted data 114 and other related data. In some configurations, data defining access rights and other properties may be communicated from the client computing device 120 to the secret store 110. With reference to the illustrative example depicted in FIG. 1, the data defining access rights and other properties may be stored in the access control list 118A.

As described in more detail below, the access control list 118A may include entries that associate properties of the data stored in the secret container 115 with individual identities and/or groups of identities. For instance, an entry may define the ownership of the secret container 115 and/or the data stored in the secret container 115. In addition, the access control list 118A may include entries that define roles for individual identities and/or groups of identities.

For example, a role may indicate if a particular identity may modify data stored in the secret container 115. As will be explained in more detail below in the description of FIG. 4, the roles that are defined in the access control list 118A may grant specific permissions for specific identities to initiate operations to be performed on specific data stored in the secret container 115. As can be appreciated, such levels of granular control of the data stored in the secret container 115 may allow for a broad range of functions that may enable, among many other benefits, users or identities to share secret data.

Next, at operation 208, the encryption key 132 is communicated to the key store 130. Once the encryption key 132 is received by the key store 130, the encryption key 132 may be stored in a record, container or any other suitable storage structure. As shown in FIG. 1, in one illustrative example, the encryption key 132 may be stored in the key container 131, which also stores metadata 133 associated with the encryption key 132. The metadata 133 may store the identifier for the encrypted data 114 as well as other data, such as data describing the cryptographic algorithm used to generate the encrypted data 114, a key lifetime, access history or any other information related to the encrypted data 114.

Next, at operation 210, the key store 130 may configure access rights and other properties of the encryption key 132 and other related data. In some configurations, data defining access rights and other properties may be communicated from the client computing device 120 to the key store 130. With reference to the illustrative example depicted in FIG. 1, the data defining access rights and other properties may be stored in the access control list 118B.

As described in more detail below, the access control list 118B may include entries that associate properties of the data stored in the key container 131 with individual identities and/or groups of identities. For instance, an entry may define the ownership of the key container 131 and/or the data stored in the key container 131. In addition, the access control list 118B may include entries that define roles for individual identities and/or groups of identities. For example, a role may indicate if a particular identity may modify data stored in the key container 131. As will be explained in more detail below in the description of FIG. 5, the roles that are defined in the access control list 118B may grant specific permissions for specific identities to initiate operations to be performed on specific data stored in the key container 131. As can be appreciated, such levels of granular control of the data stored in the key container 131 may allow for a broad range of functions that may enable, among many other benefits, sharing of secret data and other related data. After operation 210, the routine 200 ends at operation 212.

As can be appreciated, aspects of the techniques may vary from the examples shown herein. For example, in some configurations, the process of storing the encrypted data 114 may cause one or more modules of the secret store 110, such as the data manager 117A, to generate the identifier. In such configurations, the identifier may be communicated from the secret store 110 to the client computing device 120, and from the client computing device 120, the identifier may be communicated to the key store 130. As can be appreciated, storage of the identifier at the key store 130 may allow the system 100 to associate the encryption key 132 that is stored at the key store 130 with the encrypted data 114 that is stored on the secret store 110. Other variations may include the generation of the identifier at the key store 130 or the client computing device 120.

In addition to providing techniques for storing encrypted data 114 and an associated encryption key 132, techniques herein provide a routine 300 for updating encrypted data 114 and an associated encryption key 132. As can be appreciated, techniques and technologies for updating encrypted data 114 may be used to update, for example, a password that may be stored in the secret store 110. In addition, techniques and technologies disclosed herein may update an encryption key associated with the password. As described in more detail below, such techniques may utilize data indicating a key lifetime or expiration date to determine when an encryption key or other data may be renewed.

Figure 3:
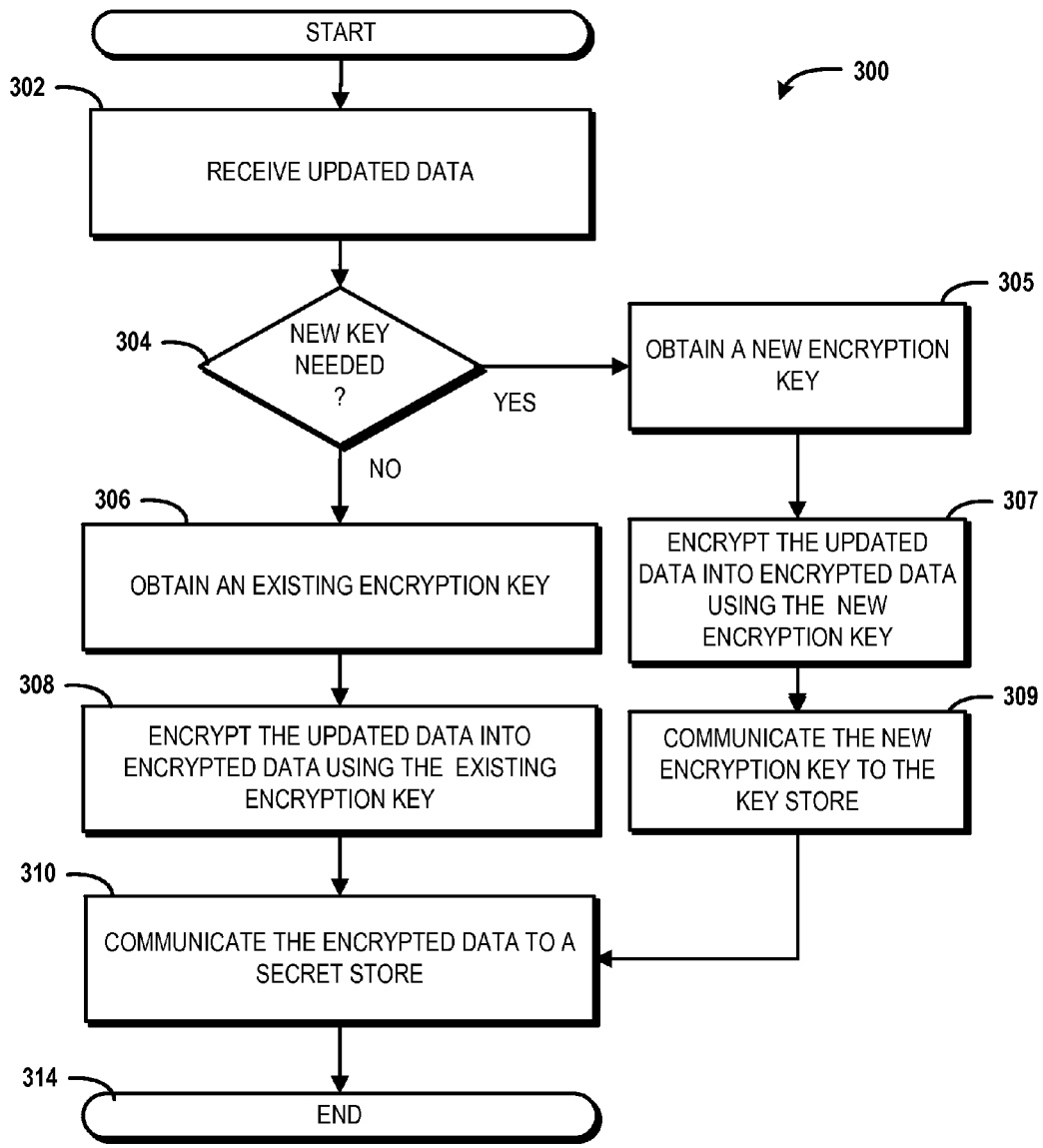
FIG. 3 is a flow diagram illustrating aspects of a method for updating secret data in a system having a secret store and a key store.

Referring now to FIG. 3, a routine 300 for updating encrypted data 114 and an associated encryption key 132 is shown and described below. The routine 300 may utilize any system, such as the system 100 shown in FIG. 1, configured to store encrypted data 114 at a first data store, such as the secret store 110, and store an associated encryption key 132 at a second data store, such as the key store 130.

The routine 300 begins at operation 302, where the program module 111 receives or generates updated data. The updated data, for example, may include an updated password or other data that is to be stored on the secret store 110. This example is provided for illustrative purposes and is not to be construed as limiting, the updated data may include any data that is to be encrypted and stored in the secret store 110. In addition, it is to be appreciated that the updated data may be generated on any computing device, including the client computing device 120.

Next, at operation 304, the system 100 determines if a new encryption key is needed. At operation 304, one or more factors may be used to determine if a new encryption key is needed. In some configurations, the client computing device 120 may send an inquiry to the key store 130 to determine if a record of an existing encryption key indicates if the existing encryption key has expired. As summarized above, when the encryption key 132 is stored in the key store 130, the key store 130 may also store other data related to the encryption key 132.

For instance, the metadata 133 may include data representing a key lifetime, an expiration date or another condition that may indicate whether any associated encryption key is valid or invalid. In one implementation of operation 304, the metadata 133, which may include a key lifetime, may indicate if a new key is needed. In such configurations, the key store 130 may communicate data indicating that a new key is needed or that a new key is not needed based on the associated metadata 133.

At operation 304, if it is determined that a new encryption key is not needed, the routine 300 proceeds to operation 306 where the client computing device 120 obtains an existing encryption key. In some configurations, an existing key, e.g., the encryption key 132 that is stored in the key container 131 may be retrieved from the key store 130. The encryption key 132 may be accessed using one or more identities authorized to access data stored in the key store 130.

In applying the illustrative example of FIG. 1, where the encryption key 132 is stored on the key store 130, operation 306 may include the retrieval of the encryption key 132 by use of a request that is configured in accordance with the configuration of the data manager 117B. For instance, if the data manager 117B is a database program, the request may be in the form of a query that is accompanied with one or more credentials for authentication. In response to the request, the key store 130 may communicate an existing key, e.g., the encryption key 132, to the client computing device 120.

Once the existing encryption key, which in the current example is encryption key 132, is obtained, the operation proceeds from operation 306 to operation 308 where the client computing device 120 encrypts the updated data into encrypted data 114 using the existing key, e.g., the encryption key 132. As summarized above, to maintain control of the updated data and the encryption key 132, the updated data may be encrypted at the client computing device 120.

At operation 304, if it is determined that a new encryption key is needed, the routine 300 proceeds to operation 305 where the client computing device 120 may obtain a new encryption key. In some configurations, the client computing device 120 may obtain a new encryption key from another resource or, alternatively, the new encryption key may be generated by one or more modules executing on the client computing device 120. Operation 305 may include the use of any cryptographic algorithm that utilizes and/or generates an encryption key.

Following operation 305, the routine 300 continues at operation 307 where the client computing device 120 encrypts the updated data into encrypted data 114 using the new encryption key. As summarized above, to maintain control of the updated data and the new encryption key, the updated data may be encrypted at the client computing device 120.

From operation 307, the routine 300 proceeds to operation 309 where the client computing device 120 communicates the new encryption key to the key store 130. Once the new encryption key is received by the key store 130, the new encryption key may be stored in a record, container or any other suitable storage structure. Similar to operation 208 of routine 200, the new encryption key may be stored in the key container 133, which also stores metadata 133 associated with the new encryption key. The metadata 133 may also be updated in operation 309. For instance, if a new cryptographic algorithm is used to encrypt the updated data, information describing the new cryptographic algorithm may be stored in the metadata 133.

After operation 308, or after operation 309, the routine 300 proceeds to operation 310 where the system 100 communicates the encrypted data 114, including the updated data, generated in operation 308 is communicated to the secret store 110. Similar to operation 204 of routine 200, operation 310 may communicate the encrypted data 114 to the secret store 110 for storage in a record, container or any other suitable storage structure.

With reference to the illustrative example of FIG. 1, operation 310 may update the secret container 115 with the encrypted data 114. Operation 310 may also include the communication of data that may update the metadata 116. For instance, if the updated data includes a new login ID, the metadata 116 may be updated to include the new login ID. In addition, at operation 310 and/or operation 309, the communication of the new encryption key or the encrypted data may include updates and/or modifications to either or both access control lists 118. These examples are provided for illustrative purposes and are not intended to be construed as limiting. After operation 310, routine 300 terminates at operation 314.

Figure 4:
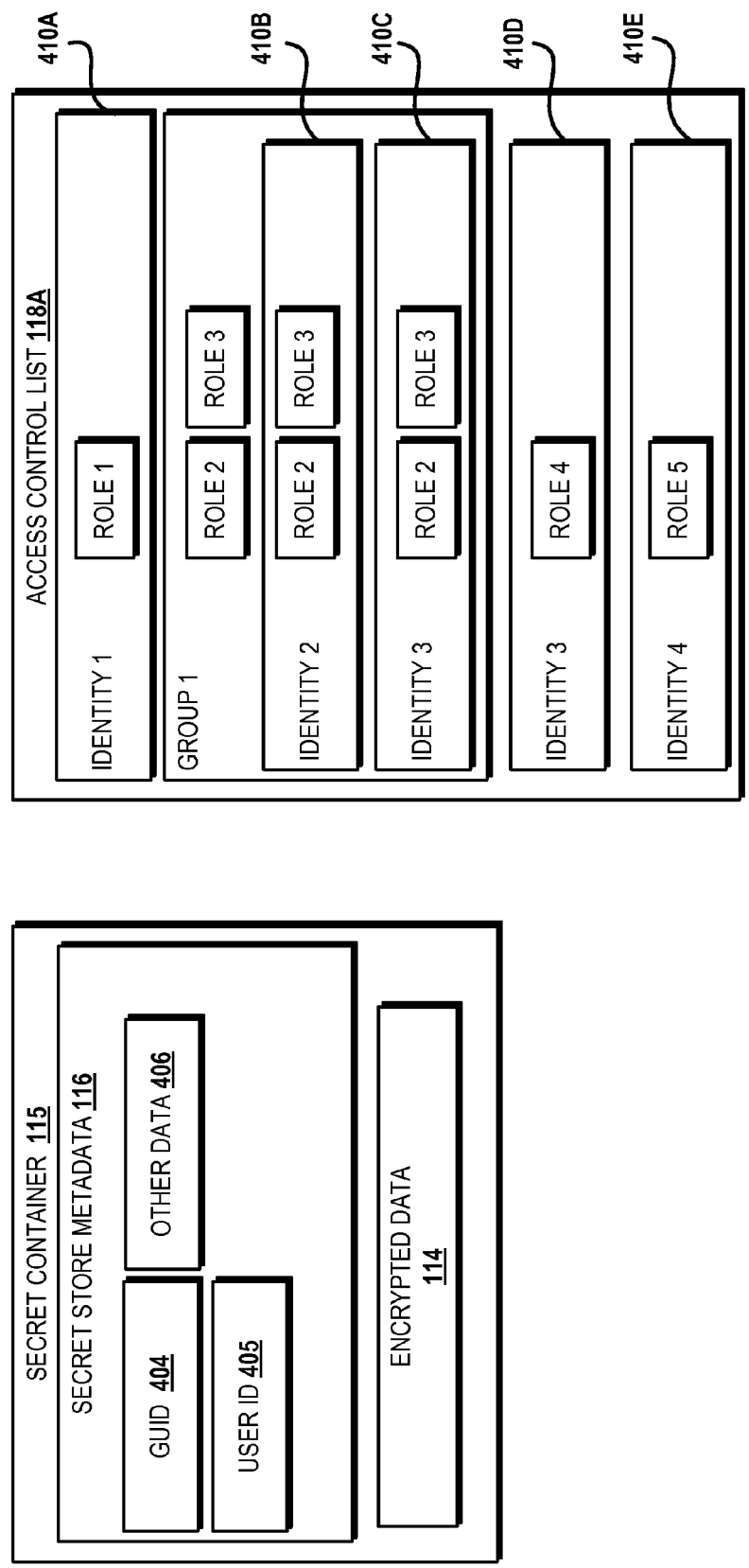
FIG. 4 is a block diagram showing several example components of a container for storing encrypted data and a corresponding access control list for the container storing the encrypted data.

As summarized above, access control settings configured at the secret store 110 and the key store 130 data may grant specific permissions for individual identities or groups of identities to initiate operations that perform various operations various levels of stored data. With reference to FIGS. 4 and 5, the following illustrative examples show various levels of control that may enable users or identities to audit, share or otherwise process secret data and other related data.

FIG. 4 illustrates a block diagram showing an access control list 118A defining access rights for the secret container 115. As summarized above, an access control list 118A stored on secret store 110 may be configured with entries defining roles and/or privileges associated with one or more identities. In general, the roles and/or privileges allow or deny an identity or a group of identities to perform operations to access and/or manage stored data. The following examples show how the defined roles and/or privileges provide a low level of granular control. As can be appreciated, the roles described in more detail below may apply to individual instances of the secret container 115 and the encrypted data 114.

As shown in FIG. 4, the access control list 118A illustrates a number of entries 410A-410E, and each entry may be associated with one or more identities and one or more roles. As summarized above, an identity may be associated with a user account, smart card, certificate or any other form of authentication. When the secret store 110 is properly accessed using a valid form of authentication associated with a particular identity, one or more of the associated operations defined in the roles may be performed.

For illustrative purposes, Table 1 lists a number of example roles that may be used for accessing and processing data stored on the secret store 110.

TABLE 1

ROLE 1: allows a computer using an associated identity to read and write operations to all data stored in the secret container 115; and allows a computer using an associated identity to grant and modify access rights for other identities and groups of identities.
ROLE 2: allows a computer using an associated identity to read all data stored in the secret container 115.
ROLE 3: allows a computer using an associated identity to modify the metadata stored in the secret container 115.
ROLE 4: allows a computer using an associated identity to modify the encrypted data 114.
ROLE 5: allows a computer using an associated identity to read the other data 406.

In the example data of Table 1, a user, machine or entity accessing the secret store 110 using Identity 1 may read and modify the metadata 116 (also referred to herein as the "secret store metadata 116") and the encrypted data 114. In addition, a user, machine or entity accessing the secret store 110 using Identity 1 may grant access rights to other identities. For example, Identity 1 may allow the client computing device 120 to execute operations that create a new identity, and/or add or delete roles for entries 410A-410E associated with any new or existing identity.

Identity 2 and Identity 3, via the association with Role 2, may allow the client computing device 120 to execute operations that access data stored on the secret container 115. Thus, if an entity accesses the secret store 110 with these identities, the metadata 116 and the encrypted data 114 may be retrieved, and if needed, returned to a computer, such as the client computing device 120. In addition, Identity 2 or Identity 3, via the association with Role 2, may allow a client computer to execute operations that write to the metadata 116 stored on the secret store 110. Thus, for example, commands issued from the client computing device 120 may modify items, such as a GUID 404, the User ID 405 or the other data 406.

As also shown in FIG. 4, Identity 3 is also associated with Role 4, which allows the client computing device 120 to execute an operation that may modify the encrypted data 114. Thus, entry 410D may supplement the access rights that are defined in entry 410C. As a result of both entries 410C and 410D, Identity 3 may write to the metadata stored in the secret container 115, as well as modify or delete the encrypted data 114. As a result of the entries 410C and 410D, Identity 3 is a member of Roles 2, 3 and 4, which allows a client computer to read all data stored in the secret container 115, modify the metadata stored in the secret container 115, and modify the encrypted data 114. As a result of entry 410E, Identity 4 is a member of Role 5, which allows a client computer to read the other data 406. In addition, the level of access for each identity may be specific to specified types of data, e.g., the encrypted data 114, the other data 406 or the metadata 116. Such an example shows techniques disclosed herein offer a granular level of access control for the data stored in the system 100.

Identity 4, via the association with Role 5, may allow a client computer to execute operations that read the other data 406 stored on the secret store 110. Thus, an entity accessing the secret store 110 with Identity 4, the allowed operations are limited to accessing the other data 406. Such limited permissions may be useful when access rights are granted to auditors or users that should be limited to the other data 406, which may include login histories or other like data.

It can be appreciated that the techniques disclosed herein may utilize any data structure defining access control parameters for one or more identities. It can also be appreciated that the techniques disclosed herein may apply one or more technologies for combining access control lists, access control entries and/or other data structures defining access rights. Such techniques are within the scope of the disclosure.

As summarized above, the access control list 118A may be configured to define group permissions that allow multiple identities to access or utilize one or more encryption keys. Such configurations allow for group access control to encrypted data and other related data based on one or more defined roles. An illustrative example of one implementation is shown in FIG. 4. In this example, Group 1 includes Identity 2 and Identity 3. In such an implementation, an administrator, e.g., accessing the secret store 110 using Identity 1 may modify the roles associated with Group 1. When the roles of Group 1 are modified, Identity 2 and Identity 3 inherit the roles assigned to Group 1, as shown in FIG. 4. As can be appreciated, operations for modifying, deleting, adding or otherwise processing entries or roles may utilize inheritance to update access data for groups of identities.

As can be appreciated, the access control settings configured at the key store 130 may be the same as the access control settings configured at the secret store 110. However, in a number of scenarios the access control settings for each data store may be different. One example showing various access control settings for the key store 130 are shown in FIG. 5.

FIG. 5 is a block diagram showing several example components of an access control list 118B defining access rights for the key container 131. Similar to the previous example, the access control list 118B stored on secret store 110 may be configured with entries defining roles and/or privileges associated with one or more identities. The roles and/or privileges allow or deny an identity or a group of identities to perform operations to access and/or manage stored data. Also shown in FIG. 5, the entries 410E-410I define roles for Identity 1, Identity 2 and Identity 3. The roles, e.g., Role 1, Role 2, Role 3 and Role 4, are associated with the various identities in a manner as described above. Similar to the example above, an identity may be associated with a user account, smart card, certificate or any other form of authentication. When the key store 130 is properly accessed using a valid form of authentication associated with a particular identity, one or more of the associated operations defined in the roles may be performed.

For illustrative purposes, Table 2 lists a number of example roles that may be used for accessing and processing data stored on the key store 130.

TABLE 2

ROLE 1: allows a computer using an associated identity to read and write operations to all data stored in the key container 131; and allows a computer using an associated identity to grant and modify access rights to data stored in the key container 131 for other identities and groups of identities.
ROLE 2: allows a computer using an associated identity to read all data stored in the key container 131.
ROLE 3: allows a computer using an associated identity to modify the metadata 133 stored in the key container 131.
ROLE 4: allows a computer using an associated identity to modify the encryption key 132.

In the example data of Table 2, a user, machine or entity accessing the key store 130 using Identity 1 may read and modify the metadata 133 (also referred to herein as the "key store metadata 133") and the encryption key 132. In addition, a user, machine or entity accessing the secret store 110 using Identity 1 may grant and modify access rights to other identities. For example, Identity 1 may allow a client computer to execute operations that create a new identity, and/or add or delete roles for entries 410E-410I associated with any identity.

Identity 2 and Identity 3, via the association with Role 2, may allow a client computer to execute operations that access data stored on the key container 131. Thus, if an entity accesses the key store 130 with these identities, the metadata 133 and the encryption key 132 may be retrieved, and if needed, returned to a computer, such as the client computing device 120. In addition, Identity 2 or Identity 3, via the association with Role 2, may allow a client computer to execute operations that write to the metadata 133 stored on the key store 130. Thus, for example, commands issued from the client computing device 120 may modify items, such as the data describing the cryptographic algorithm 505, key lifetime 506, GUID 404 or the other data 507. Similar to the example described above, the other data 507 may include login history information or other information that may be used in an audit.

As also shown in FIG. 5, Identity 3 is also associated with Role 4, which allows the client computing device 120 to modify the encryption key 132. Thus, entry 410I may supplement the access rights that are defined in entry 410H. As a result of both entries 410I and 410H, access via Identity 3 allows the client computing device 120 to read all data stored in the key container 131, modify the metadata stored in the key container 131, as well as modify the encryption key 132.

As can be appreciated, aspects of the access control settings configured at the secret store 110 and the key store 130 data may be the same, or there may be differences depending on the desired goal. For example, Role 1 in 118A may not be the same as Role 1 in 118B. In another example, the roles for Identity 1 may be similar on each data store, e.g., the secret store 110 and the key store 130, as Identity 1 may allow a client computer to access and modify data stored on both data stores. In addition, Identity 2 and Identity 3 are able to access the data of a particular record and write to metadata (116 and 133) of both data stores. In both data stores, in the current example, Identity 3 may also allow a client computer to modify the encrypted data 114 stored on the secret store 110 and modify the encryption key 132 stored on the key store 130.

Identity 4, however, is only granted read access rights to specific data, e.g., the other data 406, of the secret store 110. This example shows the granular nature of the techniques described herein, as the system 100 can be very specific as to the type of data and the level of access that may be associated with individual identities or groups of identities.

Also shown in FIG. 5, some configurations of the key container 131 may include multiple encryption keys 132A-132N. Depending on a desired result, a key container may store and control access to one or more encryption keys. For example, access control for the encryption keys 132A-132N shown in FIG. 5 may be defined by a role in the access control list 118B. Among many other examples, a role may allow a read-only access to all of the encryption keys 132A-132N in the key container 131. As can be appreciated, granular access control on a per-record and per-key basis allows for a wide range of scenarios that involve sharing and managing secure data. In other examples, the secret store 110 may contain a number of secret containers 115, and the secret store 110 may have a corresponding access control list 118A for each secret container 115. In configurations having a number of secret containers 115, it can be appreciated that different sets of encrypted data 114 and metadata 116 may have different access control permissions. In addition, in some configurations, the key store 130 may contain a number of key containers 131, and the key store 130 may also have a corresponding access control list 118B for each number of key container 131. In configurations having a number of key containers 131, it can be appreciated that different sets of encryption keys 132 and metadata 133 may have different access control permissions. As noted above, even in these other configurations, the access control lists 118A stored on the secret store 110 may not have the same access permissions and/or roles as the access control lists 118B stored on the key store 130.

As can be appreciated, the system 100 may accommodate a number of scenarios that benefit from granular control of specific types of secret data. For instance, an administrator may permit one identity, e.g., a user, to audit metadata from one data store and, at the same time, permit the identity to modify data at the other data store. Having different levels of access to different types of data, i.e., the metadata versus the encryption key or the encrypted data, accommodates many scenarios that may be needed in a business environment. In addition, the system 100 provides an added level of security by separating different types of data, e.g., separating encryption keys from the encrypted data, thereby protecting an entity or user from the vulnerabilities of giving one administrative body full control of its secret data.

Figure 6:
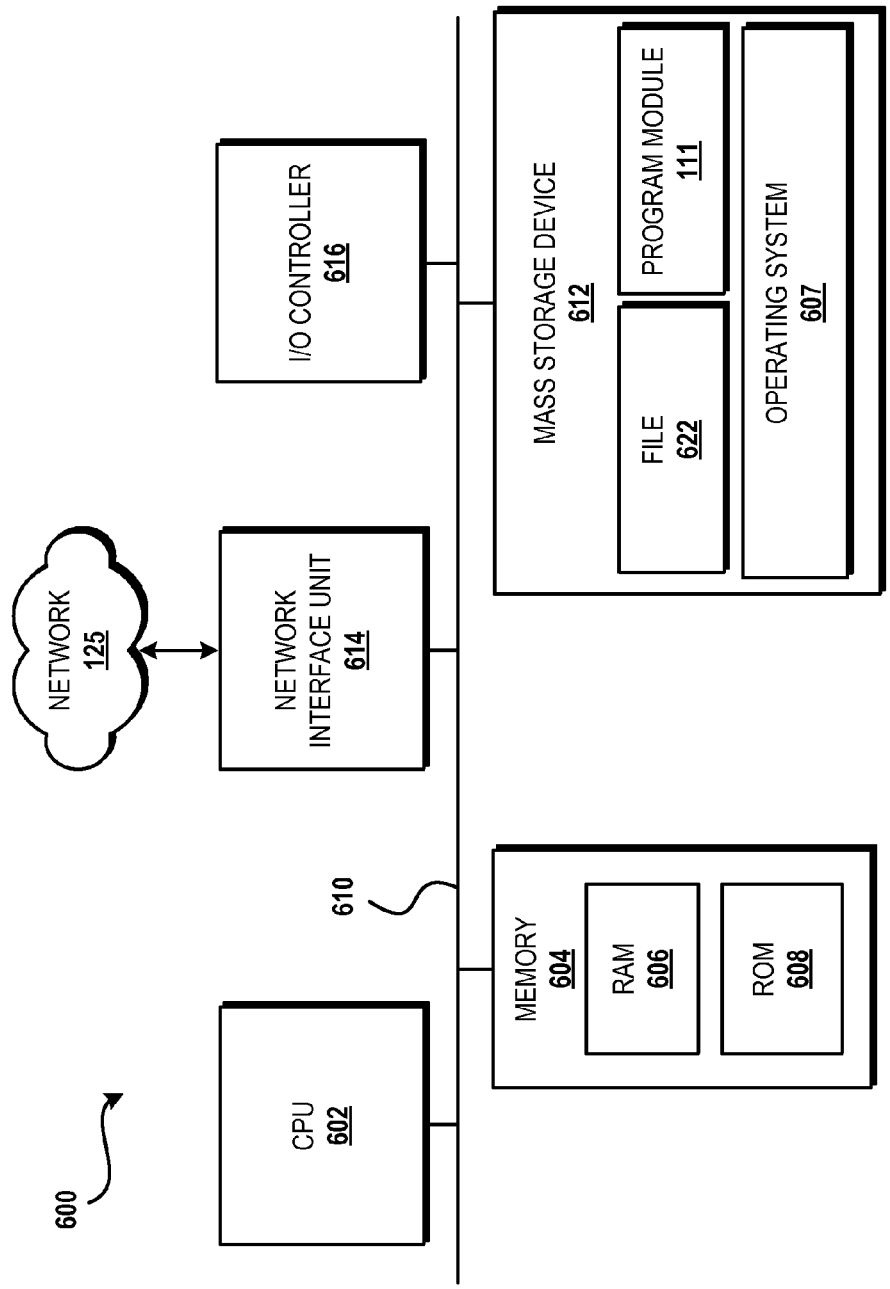
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as client computing device 120 (FIG. 1), capable of executing the program components described above for providing enhanced security for encrypted data. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 606, and a system bus 610 that couples the memory 604 to the CPU 602. A basic input/output system containing the basic routines that help to transfer information between elements within the computer architecture 600, such as during startup, is stored in the ROM 606. The computer architecture 600 further includes a mass storage device 612 for storing an operating system 607, and one or more application programs including but not limited to the program module 111. The illustrated mass storage device 612 may also store a file 622, which may include an encryption key, encrypted data, or other data needed to execute the techniques described herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 125 and/or another network (not shown). The computer architecture 600 may connect to the network 125 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
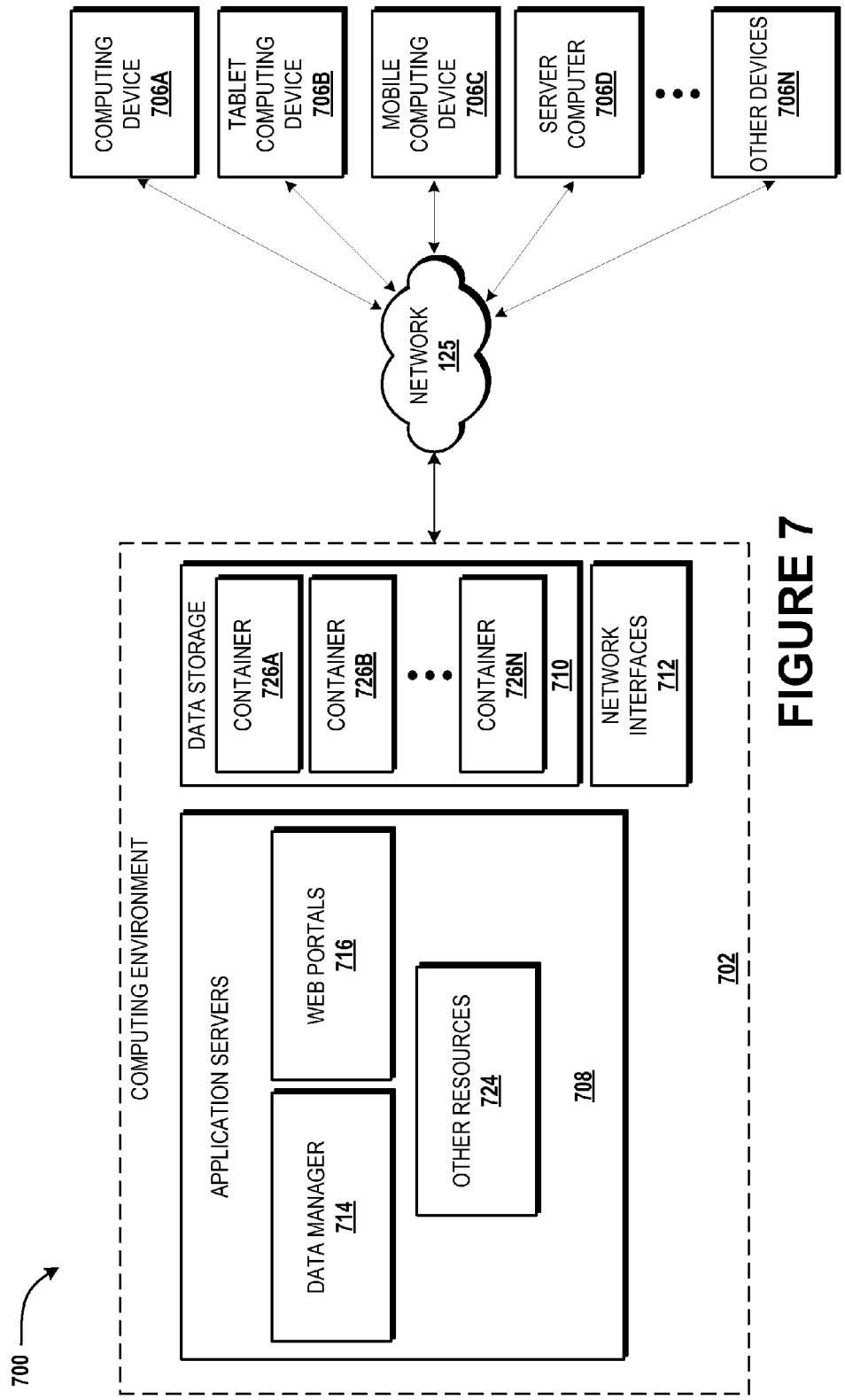
FIG. 7 is a diagram illustrating a distributed computing environment capable of implementing aspects of the techniques and technologies presented herein.

FIG. 7 depicts an illustrative distributed computing environment 700 capable of executing the software components described herein for providing enhanced security for encrypted data, among other aspects. Thus, the distributed computing environment 700 illustrated in FIG. 7 can be utilized to execute any aspects of the software components presented herein. For example, the distributed computing environment 700 can be utilized to execute aspects of the program module 111 and/or other software components described herein.

According to various implementations, the distributed computing environment 700 includes a computing environment 702 operating on, in communication with, or as part of the network 125. The network 125 may be or may include the network 125, described above with reference to FIG. 6. The network 125 also can include various access networks. One or more client devices 706A-706N (hereinafter referred to collectively and/or generically as "clients 706") can communicate with the computing environment 702 via the network 125 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 125. The application servers 708 can host various services, virtual machines, portals, and/or other resources. In the illustrated configuration, the application servers 708 may host one or more virtual machines for executing applications or other functionality. According to various implementations, the virtual machines may execute one or more applications and/or software modules for providing enhanced security for encrypted data. It should be understood that this configuration is illustrative, and should not be construed as being limiting in any way. The application servers 708 also can host or provide access to one or more portals, link pages, Web sites, and/or other information ("Web portals") 716. The Web portals 716 may be used to communicate with one or more client computer.

As shown in FIG. 7, the application servers 708 also can host other services, applications, portals, and/or other resources ("other resources") 724. The other resources 724 may deploy a service-oriented architecture or any other client-server management software. It thus can be appreciated that the computing environment 702 can provide integration of the concepts and technologies disclosed herein provided herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 125. The functionality of the data storage 710 also can be provided by one or more server computers configured to host data for the computing environment 702. The data storage 710 can include, host, or provide one or more real or virtual containers 726A-726N (hereinafter referred to collectively and/or generically as "containers 726"). The containers 726, which may be used to form a key container 131 or a secret container 115, are configured to host data used or created by the application servers 708 and/or other data. Although not illustrated in FIG. 7, the containers 726 also can host or store data structures and/or algorithms for execution by a module, such as the program module 111. Aspects of the containers 726 may be associated with a database program, file system and/or any program that stores data with secure access features. Aspects of the containers 726 may also be implemented using products or services, such as ACTIVE DIRECTORY, DKM, ONEDRIVE, DROPBOX or GOOGLEDRIVE.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing enhanced security for encrypted data, among other aspects. In one specific example, as summarized above, techniques described herein may be implemented, at least in part, by a web browser application that may work in conjunction with the application servers 708 of FIG. 7.

Figure 8:
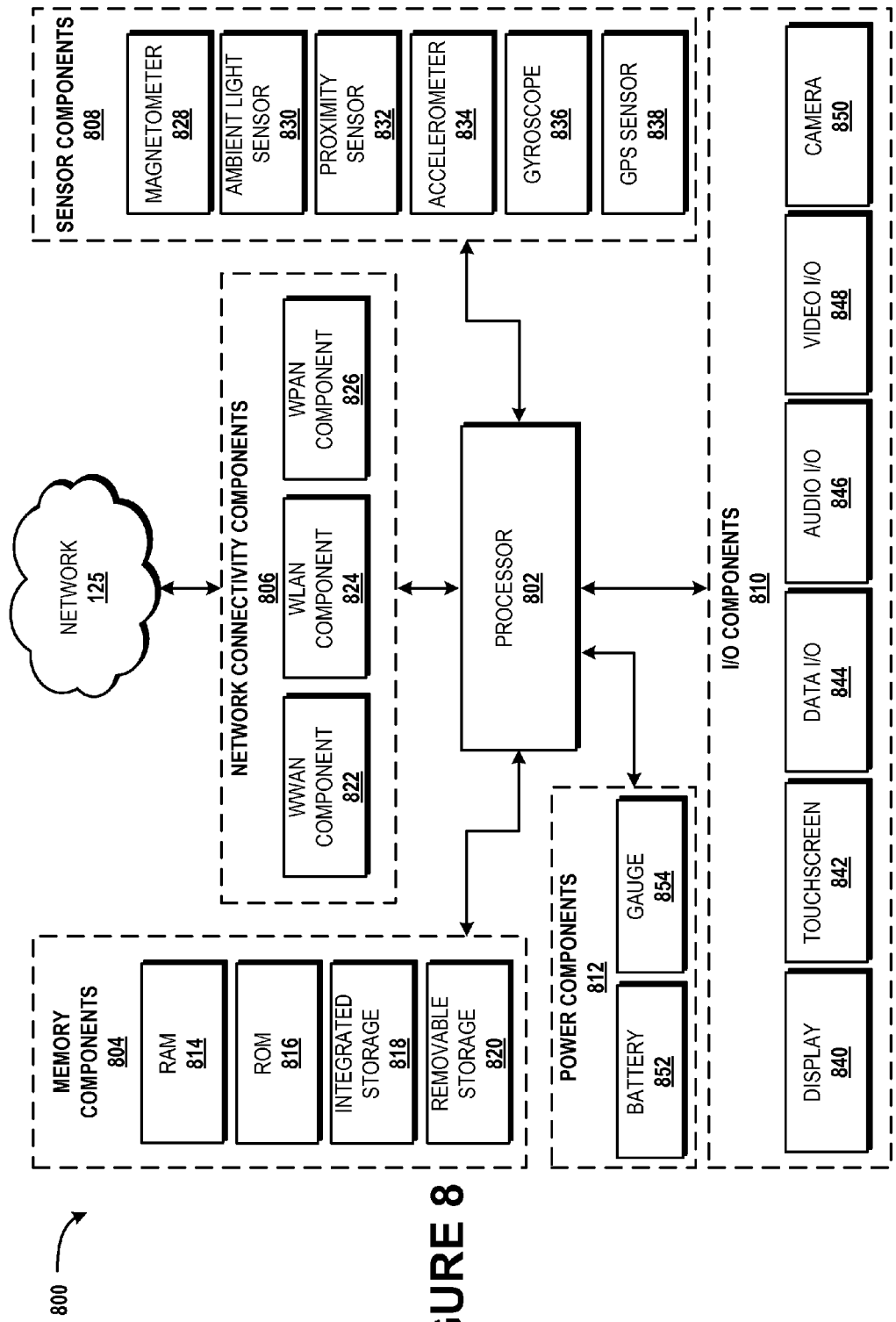
FIG. 8 is a computer architecture diagram illustrating a computing device architecture for a computing device capable of implementing aspects of the techniques and technologies presented herein.

Turning now to FIG. 8, an illustrative computing device architecture 800 for a computing device that is capable of executing various software components described herein for providing enhanced security for encrypted data. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the clients 706 shown in FIG. 7. Moreover, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, California, a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, SYMBIAN OS from SYMBIAN LIMITED, WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 125 or another network, which may be a WWAN, a WLAN, or a WPAN. Although only the network 125 is illustrated, the network connectivity components 806 may facilitate simultaneous communication with multiple networks, including the network 125 of FIG. 7. For example, the network connectivity components 806 may facilitate simultaneous communications with multiple networks via one or more of a WWAN, a WLAN, or a WPAN.

The network 125 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 125 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 125 may be configured to provide voice and/or data communications with any combination of the above technologies. The network 125 may be configured to or adapted to provide voice and/or data communications in accordance with future generation technologies.

In some configurations, the WWAN component 822 is configured to provide dual- multi-mode connectivity to the network 125. For example, the WWAN component 822 may be configured to provide connectivity to the network 125, wherein the network 125 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 125 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 125 via the WI-FI access points. Such connections may be secured via various encryption technologies including, but not limited, WI-FI Protected Access ("WPA"), WPA2, Wired Equivalent Privacy ("WEP"), and the like.

The network 125 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 828 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience.

Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component.

The disclosure presented herein may be considered in view of the following clauses.

Clause 1: A computer-implemented example including operations for: encrypting data, at a client computing device (120), using an encryption key (132) to create encrypted data (114); communicating the encrypted data (114) from the client computing device (120) to a secret store (110) of a first entity for storage of the encrypted data (114) in a secret container (115) of the secret store (110), wherein the secret container (115) comprises an identifier associated with the encrypted data (114); and communicating the encryption key from the client computing device (120) to a key store (130) of a second entity for storage of the encryption key (132) in a key container (131) of the key store (130), wherein the key container (131) comprises the identifier, the identifier also associated with the encryption key (132).

Clause 2: The example of clause 1, wherein the secret store is managed by a first set of administrative access control rights that are exclusive to the secret store, and wherein the key store is managed by a second set of administrative access control rights that are exclusive to the key store.

Clause 3: The example of clauses 1-2, wherein the client computing device is configured to modify a data structure on the secret store, the data structure on the secret store defining per-record access rights for one or more identities, and wherein the secret store allows the client computing device to retrieve, store, modify or delete the secret container.

Clause 4: The example of clauses 1-3, wherein the client computing device is configured to modify a data structure on the key store, the data structure on the key store defines per-record access rights for one or more identities, and wherein the key store allows the client computing device to retrieve, store, modify or delete the key container.

Clause 5: The example of clauses 1-4, wherein the client computing device is configured to modify a data structure on the key store, and wherein the data structure on the key store identifies a group of identities with access to the encryption key of the key container.

Clause 6: The example of clauses 1-5, wherein an instruction communicated from the client computing device to the key store modifies the data structure to change one or more access rights of the group of identities.

Clause 7: The example of clauses 1-6, wherein the client computing device is configured to modify a data structure on the secret store, and wherein the data structure on the secret store identifies a group of user accounts with access to the encrypted data of the secret container.

Clause 8: The example of clauses 1-7, wherein the key container of the key store further comprises metadata, wherein the client computing device is configured to modify a data structure on the key store, and wherein the data structure on the key store identifies a first level of access to the metadata for a first identity and a second identity and a second level of access to the encryption key for the second identity.

Clause 9: The example of clauses 1-8, wherein the secret container of the secret store further comprises metadata, wherein the client computing device is configured to modify a data structure on the secret store, wherein the data structure on the secret store identifies a first level of access to the metadata for a first identity and a second identity and a second level of access to the secret data for the second identity.

Clause 10: An example computer (120, 800), comprising: a processor (802); and a computer-readable storage medium (804) in communication with the processor (802), the computer-readable storage medium (804) having computer-executable instructions stored thereupon which, when executed by the processor (802), cause the computer (120, 800) to encrypt data using an encryption key (132) to create encrypted data (114), communicate the encrypted data (114) from the computer (120, 800) to a secret store (110) of a first entity for storage of the encrypted data (114) in a secret container of the secret store (110), wherein the secret container (115) comprises an identifier associated with the encrypted data (114), and communicate the encryption key (132) from the computer (120, 800) to a key store of a second entity for storage of the encryption key (132) in a key container (131) of the key store (130), wherein the key container (131) comprises the identifier, the identifier also associated with the encryption key (132).

Clause 11: The example computer of clause 10, wherein the secret store is managed by a first set of administrative access control rights that are exclusive to the secret store, and wherein the key store is managed by a second set of administrative access control rights that are exclusive to the key store.

Clause 12: The example computer of clauses 10 and 11, wherein the computer is further configured to modify a data structure on the secret store, the data structure on the secret store defining per-record access rights for one or more identities, and wherein the secret store allows the computer to retrieve, store, modify or delete the secret container.

Clause 13: The example computer of clauses 10-12, wherein the computer is further configured to modify a data structure on the key store, and wherein the data structure on the key store identifies a group of identities with access to the encryption key of the key container.

Clause 14: The example computer of clauses 10-13, wherein the computer is further configured to modify the data structure to change one or more access rights of the group of identities.

Clause 15: The example computer of clauses 10-12, wherein the computer is further configured to modify a data structure on the secret store, and wherein the data structure on the secret store identifies a group of user accounts with access to the encrypted data of the secret container.

Clause 16: The example computer of clauses 10-15, wherein the key container of the key store further comprises metadata, wherein the computer is further configured to modify a data structure on the key store, and wherein the data structure on the key store identifies a first level of access to the metadata for a first identity and a second identity, and a second level of access to the encryption key for the second identity.

Clause 17: The example computer of clauses 10-16, wherein the secret container of the secret store further comprises metadata, wherein the computer is further configured to modify a data structure on the secret store, and wherein the data structure on the secret store identifies a first level of access to the metadata for a first identity and a second identity, and a second level of access to the secret data for the second identity.

Clause 18: An example system including a secret store (110) comprising a plurality of secret containers, wherein the secret store (110) is managed by a first administrative access control that is exclusive to the secret store (110), wherein at least one secret container (115) of the plurality of secret containers comprises encrypted data (114), wherein the encrypted data (114) is encrypted by the use of an encryption key (132), and metadata (116) including an identifier associated with the at least one secret container (115) and the encrypted data (114); a key store (130) comprising a plurality of key containers, wherein the key store (130) is managed by a second administrative access control that is exclusive to the key store (130), and wherein at least one key container (131) of the plurality of key containers comprises the encryption key (132), and metadata (133) including the identifier associated with the at least one key container (131) and the encryption key (132); and a client computing device (120) configured to access and manage the encrypted data (114) and the encryption key (132).

Clause 19: The example system of clause 18, wherein the client computing device is further configured to modify a data structure on the secret store, and wherein the data structure on the secret store identifies a first level of access to the metadata for a first identity and a second identity and a second level of access to the secret data for the second identity.

Clause 20: The example system of clauses 18-19, wherein the client computing device is further configured to modify a data structure on the key store, and wherein the data structure on the key store identifies a first level of access to the metadata for a first identity and a second identity and a second level of access to the encryption key for the second identity.

Clause 21: A computer-implemented example method, the method including computer-implemented operations for: receiving data update (113) at the client computing device (120); determining, at the client computing device, if there is a need to change an existing encryption key (132A); if it is determined that there is a need to change the existing encryption key (132A), encrypting, at a client computing device (120), the data update (113) to create encrypted data (114) using a new encryption key (132B), communicating the encrypted data (114) from the client computing device (120) to a first data store of a first entity for storage of the encrypted data (114) in a secret container (115) on the first data store (110), wherein the encrypted data (114) is associated with an identifier, and communicating the new encryption key (132B) from the client computing device (120) to a second data store (130) of a second entity for storage of the new encryption key (132B) in a key container (131) of the second data store (130), wherein the identifier is further associated with the new encryption key (132B).

Clause 22: The example of clause 21, wherein the example further includes if it is determined that there is not a need to change the existing encryption key, encrypting, at the client computing device, the data update to create the encrypted data using the existing encryption key, and communicating the encrypted data from the client computing device to the first data store for storage of the encrypted data on the first data store, wherein the encrypted data is associated with the identifier.

Clause 23: The example of clauses 21-22, wherein determining if there is the need to change the existing encryption key includes accessing metadata stored in the second data store, wherein the metadata is associated with the existing encryption key, and wherein the metadata indicates an attribute associated with the existing encryption key; determining, at the client computing device, if the attribute associated with the existing encryption key meets a condition; and determining, based on the condition, that there is the need to change the existing encryption key.

Clause 24: The example of clauses 21-23wherein the attribute indicates a time, wherein the condition defines a period of time, and wherein determining if the attribute associated with the existing encryption key meets the condition is based on the time and the period of time.

Clause 25: The example of clauses 21-24, wherein the client computing device is configured to modify a data structure on the first data store, the data structure on the first data store defining per-record access rights for one or more identities, and wherein the first data store allows the client computing device to retrieve, store, modify or delete the secret container.

Clause 26: The example of clauses 21-25, wherein the client computing device is configured to modify a data structure on the second data store, the data structure on the second data store defines per-record access rights for one or more identities, and wherein the second data store allows the client computing device to retrieve, store, modify or delete the key container.

Clause 27: The example of clauses 21-26, wherein the client computing device is configured to modify a data structure on the second data store, and wherein the data structure on the second data store identifies a group of identities with access to the encryption key of the key container.

Clause 28: The example of clauses 21-27, wherein the key container of the second data store further comprises metadata, wherein the client computing device is configured to modify a data structure on the second data store, and wherein the data structure on the second data store identifies a first level of access to the metadata for a first identity and a second identity and a second level of access to the encryption key for the second identity.

Clause 29: The example of clauses 21-28, wherein the secret container of the first data store further comprises metadata, wherein the client computing device is configured to modify a data structure on the first data store, wherein the data structure on the first data store identifies a first level of access to the metadata for a first identity and a second identity and a second level of access to the encrypted data for the second identity.

Clause 30: a computer (120, 800), including a processor (802); and a computer-readable storage medium (804) in communication with the processor (802), the computer-readable storage medium (804) having computer-executable instructions stored thereupon which, when executed by the processor (802), cause the computer (120, 800) to receive a new password (113); determine if there is a need to change an existing encryption key (132); if it is determined that there is a need to change the existing encryption key (132), encrypt the new password (113) to create an encrypted password (114) using a new encryption key, communicate the encrypted password (114) from the computer (120, 800) to a first data store of a first entity for storage of the encrypted password (114) in a secret container (115) on the first data store (110), wherein the encrypted password (114) is associated with an identifier, and communicate the new encryption key (132) from the computer (120, 800) to a second data store (130) of a second entity for storage of the new encryption key (132) in a key container (131) of the second data store (130), wherein the identifier is further associated with the new encryption key (132).

Clause 31: The computer of clause 30, wherein the computer-readable storage medium has further computer-executable instructions stored thereupon which, when executed by the processor, cause the computer to: if it is determined that there is not a need to change the existing encryption key, encrypt the new password to create the encrypted password using the existing encryption key, and communicate the encrypted password from the computer to the first data store for storage of the encrypted password on the first data store, wherein the encrypted password is associated with the identifier.

Clause 32: The computer of clauses 30-31, wherein determining if there is the need to change the existing encryption key, comprises: accessing metadata stored in the second data store, wherein the metadata is associated with the existing encryption key, and wherein the metadata indicates an attribute associated with the existing encryption key; determining if the attribute associated with the existing encryption key meets a condition; and communicating a need to change the existing encryption key to the computer if the attribute associated with the existing encryption key does not meet the condition.

Clause 33: The computer of clauses 30-32, wherein the attribute indicates a time, wherein the condition defines a period of time, and wherein the attribute associated with the existing encryption key does not meet the condition if the time is outside of the period of time.

Clause 34: The computer of clauses 30-33, wherein determining if there is the need to change the existing encryption key is based on an input receive at the computer.

Clause 35: The computer of clauses 30-34, wherein determining if there is the need to change the existing encryption key is based on a configuration setting at the computer.

Clause 36: The computer of clauses 30-35, wherein determining if there is the need to change the existing encryption key, comprises: accessing data stored in the computer, wherein the data indicates an attribute associated with the existing encryption key; determining if the attribute associated with the existing encryption key meets a condition; and determining the need to change the existing encryption key if the attribute associated with the existing encryption key meets the condition.

Clause 37: A computer-readable storage medium (804) having computer-executable instructions stored thereupon which, when executed by a computer (120, 800), cause the computer (120, 800) to: receive a new password (113); determine if there is a need to change an existing encryption key (132); if it is determined that there is a need to change the existing encryption key (132), encrypt the new password (113) to create an encrypted password (114) using a new encryption key, communicate the encrypted password (114) from the computer (120, 800) to a first data store of a first entity for storage of the encrypted password (114) in a secret container (115) on the first data store (110), wherein the encrypted password (114) is associated with an identifier, and communicate the new encryption key (132) from the computer (120, 800) to a second data store (130) of a second entity for storage of the new encryption key (132) in a key container (131) of the second data store (130), wherein the identifier is further associated with the new encryption key (132).

Clause 38: the computer-readable storage medium of clause 37, wherein the computer-readable storage medium comprises further computer-executable instructions stored thereupon for causing the computer to: if it is determined that there is not a need to change the existing encryption key, encrypt the new password to create the encrypted password using the existing encryption key, and communicate the encrypted password from the computer to the first data store for storage of the encrypted password on the first data store, wherein the encrypted password is associated with the identifier.

Clause 39: the computer-readable storage medium of clauses 37-38, wherein determining if there is the need to change the existing encryption key, comprises: accessing metadata stored in the second data store, wherein the metadata is associated with the existing encryption key, and wherein the metadata indicates an attribute associated with the existing encryption key; determining if the attribute associated with the existing encryption key meets a condition; and determining, based on the condition, that there is the need to change the existing encryption key.

Clause 40: the computer-readable storage medium of clauses 37-39, wherein the attribute indicates a time, wherein the condition defines a period of time, and wherein the attribute associated with the existing encryption key does not meet the condition if the time is outside of the period of time.

Based on the foregoing, it should be appreciated that concepts and technologies have been disclosed herein that provide enhanced security for encrypted data. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, the method comprising computer-implemented operations for:
   receiving a data update at a client computing device;
   determining, at the client computing device, if there is a need to change an existing encryption key;
   if it is determined that there is the need to change the existing encryption key,
   encrypting, at the client computing device, the data update to create encrypted data update using a new encryption key,
   communicating the encrypted data update from the client computing device to a first data store of a first entity for storage of the encrypted data update and a first meta data associated with the encrypted data update in a secret container on the first data store, wherein the encrypted data update is associated with an identifier, wherein the identifier is stored in the first metadata, and
   communicating the new encryption key from the client computing device to a second data store of a second entity for storage of the new encryption key in a key container of the second data store, wherein the identifier is further associated with the new encryption key, and the identifier is stored in a second metadata associated with the new encryption key, wherein the key container of the second data store further comprises the second metadata, wherein the client computing device is configured to modify a data structure on the second data store, and wherein the data structure on the second data store identifies a first level of access to the second metadata for a first identity and a second level of access to the existing or new encryption key for a second identity, wherein the first level of access and the second level of access are different;
   wherein determining if there is the need to change the existing encryption key comprises:
      accessing the second metadata stored in the second data store, wherein the second metadata is associated with the existing encryption key, and wherein the second metadata indicates an attribute associated with the existing encryption key, determining, at the client computing device, if the attribute associated with the existing encryption key meets a condition, determining, based on the condition, that there is the need to change the existing encryption key, and communicating the new encryption key in response to determining that there is the need to change the existing encryption key.

2. The computer-implemented method of claim 1, wherein the method further comprises:

if it is determined that there is not a need to change the existing encryption key, encrypting, at the client computing device, the data update to create the encrypted data update using the existing encryption key, and communicating the encrypted data update from the client computing device to the first data store for storage of the encrypted data update on the first data store, wherein the encrypted data update is associated with the identifier.

3. The computer-implemented method of claim 1, wherein the attribute indicates a time, wherein the condition defines a period of time, and wherein determining if the attribute associated with the existing encryption key meets the condition is based on the time and the period of time.

4. The computer-implemented method of claim 1, wherein the client computing device is configured to modify a data structure on the first data store, the data structure on the first data store defining per-record access rights for one or more identities, and wherein the first data store allows the client computing device to retrieve, store, modify or delete the secret container.

5. The computer-implemented method of claim 1, wherein the client computing device is configured to modify the data structure on the second data store, the data structure on the second data store defines per-record access rights for one or more identities, and wherein the second data store allows the client computing device to retrieve, store, modify or delete the key container.

6. The computer-implemented method of claim 1, wherein the data structure on the second data store identifies a group of identities with access to the existing or new encryption key of the key container.

7. The computer-implemented method of claim 1, wherein the secret container of the first data store further comprises the first metadata, wherein the client computing device is configured to modify a data structure on the first data store, wherein the data structure on the first data store identifies a second identity and the second level of access to the encrypted data update for the second identity.

8. A computer, comprising:
a processor; and
a computer-readable storage medium in communication with the processor, the computer-readable storage medium having computer-executable instructions stored thereupon which, when executed by the processor, cause the computer to receive a new password;
determine if there is a need to change an existing encryption key;
if it is determined that there is the need to change the existing encryption key, encrypt the new password to create an encrypted new password using a new encryption key,
communicate the encrypted new password from the computer to a first data store of a first entity for storage of the encrypted new password and a first metadata associated with the encrypted new password in a secret container on the first data store, wherein the encrypted new password is associated with an identifier, wherein the identifier is stored in the first meta data, and communicate the new encryption key from the computer to a second data store of a second entity for storage of the new encryption key in a key container of the second data store, wherein the identifier is further associated with the new encryption key and the identifier is stored in a second metadata associated with the new encryption key; wherein the key container of the second data store further comprises the second metadata, and modify a data structure on the second data store; the data structure on the second data store identifies a first level of access to the second metadata for a first identity and a second identity and a second level of access to the existing or new encryption key for the second identity, wherein the first level of access and the second level of access are different;

wherein determining if there is the need to change the existing encryption key, comprises:

accessing the second metadata stored in the second data store, wherein the second metadata is associated with the existing encryption key, and wherein the second metadata indicates an attribute associated with the existing encryption key, determining if the attribute associated with the existing encryption key meets a condition, determining, based on the condition, that there is the need to change the existing encryption key, and communicating the new encryption key in response to determining that there is the need to change the existing encryption key.

9. The computer of claim 8, wherein the computer-readable storage medium has further computer-executable instructions stored thereupon which, when executed by the processor, cause the computer to:

if it is determined that there is not a need to change the existing encryption key, encrypt the new password to create the encrypted new password using the existing encryption key, and communicate the encrypted new password from the computer to the first data store for storage of the encrypted new password on the first data store, wherein the encrypted new password is associated with the identifier.

10. The computer of claim 8, wherein the attribute indicates a time, wherein the condition defines a period of time, and wherein the attribute associated with the existing encryption key does not meet the condition if the time is outside of the period of time.

11. The computer of claim 8, wherein determining if there is the need to change the existing encryption key is based on an input received at the computer.

12. The computer of claim 8, wherein determining if there is the need to change the existing encryption key is based on a configuration setting at the computer.

13. A non-signal computer-readable storage medium having computer-executable instructions stored thereupon which, when executed by a computer, cause the computer to:

receive a new password;

determine if there is a need to change an existing encryption key;

if it is determined that there is the need to change the existing encryption key, encrypt the new password to create an encrypted new password using a new encryption key, communicate the encrypted new password from the computer to a first data store of a first entity for storage of the encrypted new password and a first metadata associated with the encrypted new password in a secret container on the first data store, wherein the encrypted new password is associated with an identifier, wherein the identifier is stored in the first metadata and communicate the new encryption key from the computer to a second data store of a second entity for storage of the new encryption key in a key container of the second data store, wherein the identifier is further associated with the new encryption key and the identifier is stored in a second metadata associated with the new encryption key, wherein the key container of the second data store further comprises the second metadata, and modify a data structure on the second data store; the data structure on the second data store identifies a first level of access to the second metadata for a first identity and a second identity and a second level of access to the existing or new encryption key for the second identity; wherein the first level of access and the second level of access are different;

wherein determining if there is the need to change the existing encryption key, comprises:

accessing the second metadata stored in the second data store, wherein the second metadata is associated with the existing encryption key, and wherein the second metadata indicates an attribute associated with the existing encryption key, determining if the attribute associated with the existing encryption key meets a condition, determining, based on the condition, that there is the need to change the existing encryption key, and communicating the new encryption key in response to determining that there is the need to change the existing encryption key.

14. The non-signal computer-readable storage medium of claim 13, further comprising computer-executable instructions stored thereupon for causing the computer to:

if it is determined that there is not a need to change the existing encryption key, encrypt the new password to create the encrypted new password using the existing encryption key, and communicate the encrypted new password from the computer to the first data store for storage of the encrypted new password on the first data store, wherein the encrypted new password is associated with the identifier.

15. The non-signal computer-readable storage medium of claim 13, wherein the attribute indicates a time, wherein the condition defines a period of time, and wherein the attribute associated with the existing encryption key does not meet the condition if the time is outside of the period of time.

* * * * *